(No Model.) 2 Sheets—Sheet 1.
C. H. THOMPSON.
FERTILIZER DISTRIBUTER FOR CORN PLANTERS.
No. 309,110. Patented Dec. 9, 1884.
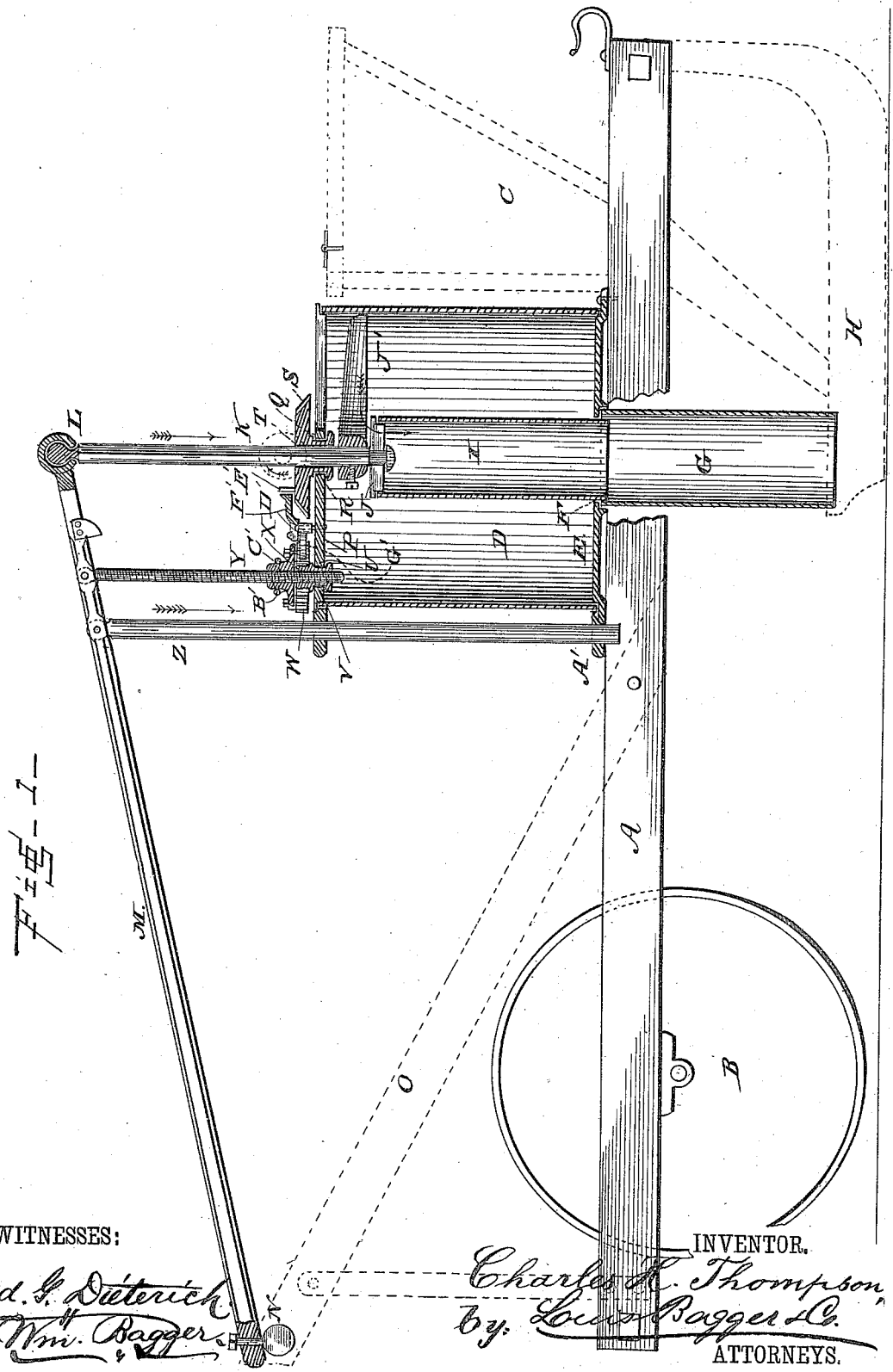

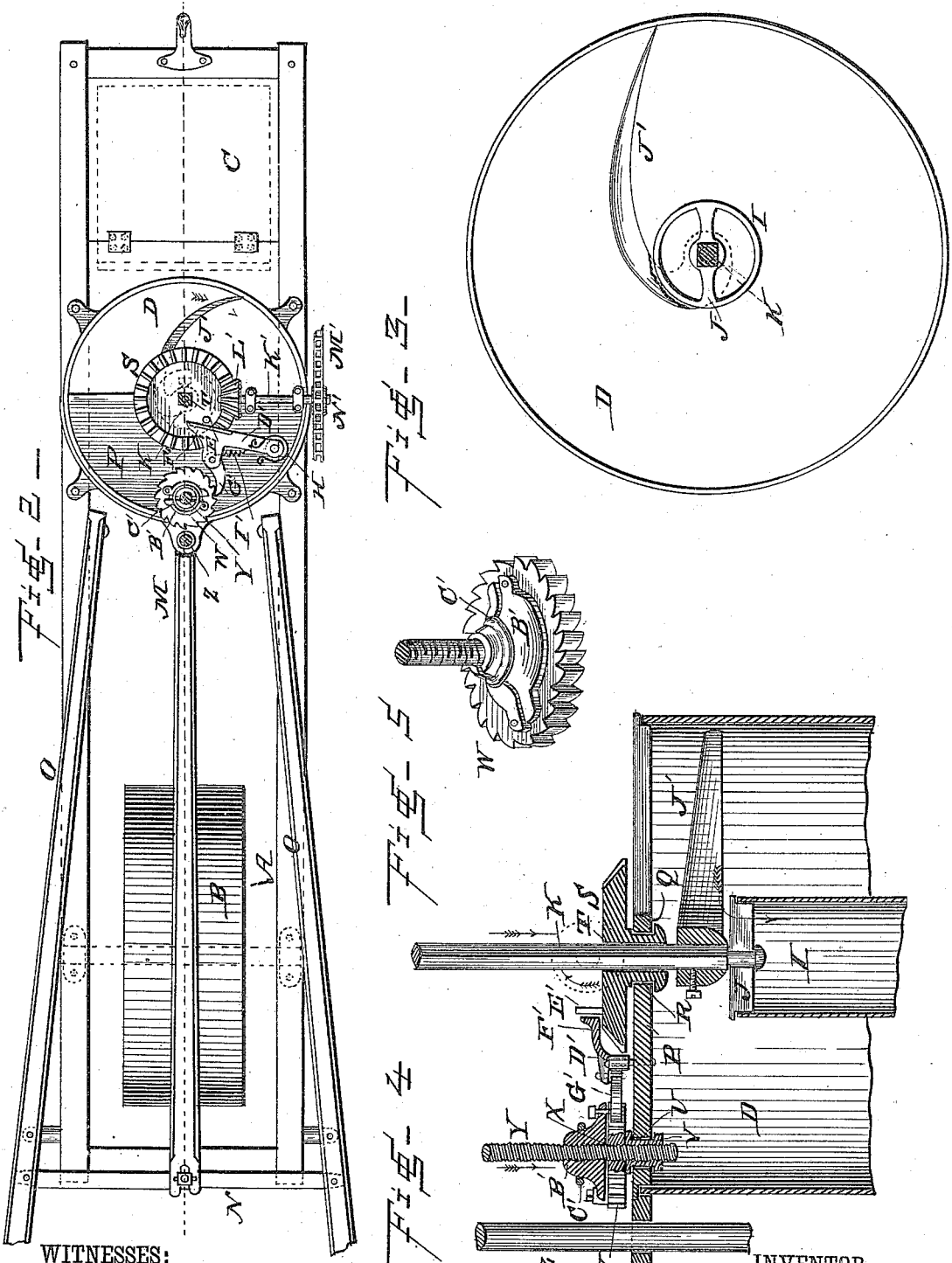

UNITED STATES PATENT OFFICE.

CHARLES H. THOMPSON, OF CLAREMONT, NEW HAMPSHIRE.

FERTILIZER-DISTRIBUTER FOR CORN-PLANTERS.

SPECIFICATION forming part of Letters Patent No. 309,110, dated December 9, 1884.

Application filed June 14, 1884. (No model.)

*To all whom it may concern:*

Be it known that I, CHARLES H. THOMPSON, a citizen of the United States, and a resident of Claremont, in the county of Sullivan and State of New Hampshire, have invented certain new and useful Improvements in Fertilizer-Distributers for Corn-Planters; and I do hereby declare that the following is a full, clear, and exact description of the invention, which will enable others skilled in the art to which it appertains to make and use the same, reference being had to the accompanying drawings, which form a part of this specification, and in which—

Figure 1 is a longitudinal vertical sectional view of my improved fertilizing attachment to corn-planters, showing it in position upon the frame of such planter, and showing, also, the hopper of the latter in outline. Fig. 2 is a plan view of the same, and Figs. 3, 4, and 5 are detail views.

The same letters refer to the same parts in all the figures.

This invention has reference to fertilizing attachments for corn-planters, especially for that class of the latter which are known as "walking-planters;" and it has for its object to provide a device which shall be simple in construction, durable, and inexpensive, and which will feed the fertilizing material under all circumstances, even although it may be moist or sticky, with equal facility and certainty.

To this end it consists in the improved construction and arrangement of parts, which will be hereinafter fully described, and particularly pointed out in the claims.

In the drawings, A designates the frame of the planter, which may be of any suitable construction, and which is provided near its rear end with a transverse shaft or axle carrying the driving-wheel B. The corn-hopper C is arranged in any suitable manner at the front end of the frame, and the seeding mechanism, which may be of any suitable construction, is not shown in the drawings.

D is the fertilizing hopper or receptacle, which is arranged upon the frame directly in rear of the corn-hopper. The said receptacle is cylindrical in shape, and is made of such dimensions as to hold any suitable quantity of the manure. The bottom E of the said receptacle has a centrally-located circular opening, F, from which a tube, G, extends in a downward direction between the beams of the frame.

H designates a plow or furrow-opener of ordinary construction, which is secured to the front end of the frame, from which it extends in a rearward direction, its rear end being bifurcated and serving to support the tube G, which extends downwardly from the hopper D, as stated.

I designates a tube extending upwardly into the hopper D, and so arranged as to slide telescopically within the tube G, as will be clearly seen by reference to Fig. 1 of the drawings. The said tube is provided at its upper end with a cross-bar, J, in which is swiveled an upwardly-extending rod or bar, K, which latter is square in cross-section, as will be seen in the drawings. The upper end of the said rod is connected by a ball-and-socket joint, L, to the front end of a lever, M, the rear end of which is pivotally connected to the round N, which connects the handles O O near the rear end of the frame. The hopper D is provided with a half-cover, P, covering the rear part of the same, and having a bearing, Q, concentric with the hopper, for the shank R of a bevel wheel or disk S, located horizontally upon the upper side of the cover. The said bevel-wheel and its shank are provided with a central square perforation, T, through which the rod K passes in such a manner as to be capable of moving freely up and down. The cover P is provided near its rear end with an opening, U, in which is journaled the shank V of a ratchet-wheel, W, which latter is located upon the upper side of the cover, as shown. The said ratchet-wheel and shank are provided with a central opening, X, through which passes a screw-threaded rod, Y, which is pivoted at its upper end to the bar or lever M. Pivoted to the latter a short distance in rear of the screw-threaded rod Y is a guide-rod, Z, extending downwardly through suitable perforated brackets, A', upon the rear side of the cylindrical hopper B. The upper side of the ratchet-wheel W is provided with a split or clamping nut, B', adapted to be clamped upon the screw-threaded rod Y by means of a ring, C'. It will be seen that by removing the latter the nut may be detached, thus enabling the screw-threaded rod to be raised through the ratchet-wheel and its shank from the hopper D.

D' is a plate mounted pivotally on top of the cover, near the periphery of the latter, and extending in an inward direction over the disk or plate S, which latter is provided with one or more upwardly-extending pins, E', by means of which the said plate may be operated. The plate D' is provided near its inner end with a laterally-extending lug, F', to which is pivoted a dog or pawl, G', engaging the ratchet-wheel W, as shown. The plate D' is thrown in a forward direction by means of a suitably-arranged spring, H', and a retracting-spring, I', connects it with the rear or inner end of the pawl G', which latter is thereby held in contact with the periphery of the ratchet-wheel.

J' is a curved or scoop-shaped wing or arm, attached securely to the lower end of the rod K, directly above the point at which it is connected to the sliding tube I. The construction or conformation of the said wing or arm is such that when the rod or shaft K, upon which it is mounted, revolves it shall scoop or scrape the contents of the box or hopper D and convey it into the tube I, from whence it will pass through the tube G to the furrow formed in the ground by the action of the plow H.

The cover P of the hopper is provided with suitable bearings for a short transverse shaft, K', the inner end of which is provided with a pinion, L', engaging the bevel-wheel S, and thus imparting motion to the several operating parts of the machine, the said shaft K' being in turn operated by means of a belt or chain, M', running upon a pulley or chain-wheel, N', at the outer end of the said shaft, and also upon a band-wheel or pulley which is mounted in any suitable position upon one end of the shaft of the driving-wheel.

The operation of this invention is as follows: The hopper D is first filled with any suitable fertilizing material through the opening at its upper front end. Before this, however, the tube I should be raised or lifted within the hopper, this being accomplished in the manner described by removing the split nut which encircles the screw-threaded rod Y, when the lever or bar M may be raised, carrying with it the rod K and the tube attached thereto, the screw-threaded rod Y, and the guide-rod Z. The split nut is then again adjusted upon the screw-threaded rod, and the machine is then ready for operation. As the machine passes over the field, motion will be imparted from the driving-wheel to the shaft K, which latter, revolving, will in turn impart a rotary motion to the disk. As the latter revolves the pins E' will in turn strike the free end of the pivoted plate D', which latter is held in contact with the said pins by the action of the spring herein described. The pawl G', pivoted to the said plate, will at the same time serve to impart a rotary motion to the ratchet-wheel W, which latter in revolving will cause the screw-threaded rod Y to pass in a downward direction, carrying with it the lever M and its attachments, notably the rod K, at its outer end, which serves to lower the tube I telescopically into the tube G. The bevel-wheel S in revolving serves at the same time to impart a rotary motion to the rod K, causing the wing or arm at the lower end of the latter to rake or scrape the fertilizing material equally and evenly into the tube I, from whence it passes to the furrow.

It is obvious that this device may be applied to corn-planters of many different constructions with equal facility and with equally satisfactory results. I would also have it understood that I do not wish to be considered as limiting myself to the precise construction and arrangement of details herein described, as numerous modifications might be made without departing from the spirit of my invention.

Having thus described my invention, I claim and desire to secure by Letters Patent of the United States—

1. A fertilizing attachment to corn-planters, comprising, mainly, a cylindrical hopper having a downwardly-extending feed-tube, a tube sliding telescopically within the latter, and a rotary arm or scoop adapted to scrape the material from the upper end of the hopper into the said telescopic tube, substantially as set forth.

2. The combination, with a corn-planter, of a cylindrical hopper mounted upon the frame of the same in rear of the corn-hopper, and having a downwardly-extending feed-tube, a tube extending upwardly into the hopper, and arranged to slide within the said feed-tube, a rod extending upwardly from a brace or bar at the upper end of the inner tube and carrying at its lower end a rotary arm or scoop, and mechanism for revolving the said rod and for lowering it and its attachments evenly and gradually into the hopper, substantially as set forth.

3. In a fertilizing attachment for corn-planters, the combination, with a cylindrical hopper having downwardly-extending tube, of an upwardly-extending tube telescoping within the former, a rod swiveled in a bar at the upper end of the inner tube and extending upwardly through a bevel-wheel journaled centrally in the cover of the hopper, and having its upper end connected by a ball-and-socket joint to a lever fulcrumed to the round which connects the handles of the planter-frame, a downwardly-extending screw-threaded rod hinged to the said lever and extending through a ratchet-wheel into the hopper, upon the upper side of whose cover the said ratchet-wheel is journaled, a split nut connected to the said ratchet-wheel and adapted to clamp the said screw, a guide-rod connected pivotally to the lever and extending downwardly through perforated brackets upon the rear side of the hopper, and mechanism for imparting a rotary motion to the bevel-wheel and ratchet-wheel on top of the cover of the hopper, whereby the feed mechanism of the machine is operated, substantially as set forth.

4. The combination, with the cylindrical hopper, of a bevel-wheel mounted centrally upon the cover of the same, and having upwardly-extending pins, a ratchet-wheel mounted near the periphery of the cover, a plate pivoted near the periphery of the cover and extending inwardly over the bevel-wheel, engaging the pins of the latter, a dog or pawl pivoted to the said plate and engaging the ratchet-wheel, and suitably-arranged springs holding the said plate and pawl to their work, the said mechanism serving to actuate the feed mechanism of the fertilizer, substantially as set forth.

In testimony that I claim the foregoing as my own I have hereunto affixed my signature in presence of two witnesses.

CHARLES H. THOMPSON.

Witnesses:
 EDWIN B. HEYWOOD,
 GEORGE A. EDSON.